(12) United States Patent
Kanno

(10) Patent No.: US 8,097,382 B2
(45) Date of Patent: Jan. 17, 2012

(54) FUEL CELL SYSTEM AND CONTROL METHOD THEREOF

(75) Inventor: Yoshihito Kanno, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 486 days.

(21) Appl. No.: 12/278,997

(22) PCT Filed: Jan. 31, 2007

(86) PCT No.: PCT/IB2007/000230
§ 371 (c)(1),
(2), (4) Date: Aug. 11, 2008

(87) PCT Pub. No.: WO2007/093865
PCT Pub. Date: Aug. 23, 2007

(65) Prior Publication Data
US 2009/0226777 A1 Sep. 10, 2009

(30) Foreign Application Priority Data
Feb. 17, 2006 (JP) ................. 2006-040299

(51) Int. Cl.
*H01M 8/04* (2006.01)
(52) U.S. Cl. ................. 429/483; 429/443
(58) Field of Classification Search ............ 429/12, 429/13, 34, 36, 38, 483, 443, 444, 450, 452, 429/417
See application file for complete search history.

(56) References Cited

U.S. PATENT DOCUMENTS

| | | | | |
|---|---|---|---|---|
| 5,763,113 A | * | 6/1998 | Meltser et al. | 429/432 |
| 5,875,768 A | | 3/1999 | Schenk et al. | |
| 2001/0018142 A1 | * | 8/2001 | Kato et al. | 429/22 |
| 2003/0022045 A1 | * | 1/2003 | Wells et al. | 429/26 |
| 2004/0197621 A1 | | 10/2004 | Balliet et al. | |

FOREIGN PATENT DOCUMENTS

| | | |
|---|---|---|
| JP | 2004-20332 | 1/2004 |
| JP | 2004-95300 | 3/2004 |
| JP | 2004-279063 | 10/2004 |
| JP | 2005-251665 | 9/2005 |

OTHER PUBLICATIONS

S. Doerner et al., Sensors, 2004, Proceedings of IEEE Vienna, Austria Oct. 24-27, 2004, pp. 639-641 (2004).

* cited by examiner

*Primary Examiner* — Jennifer Michener
*Assistant Examiner* — Monique Wills
(74) *Attorney, Agent, or Firm* — Finnegan, Henderson, Farabow, Garrett & Dunner, LLP

(57) ABSTRACT

A fuel cell system (10) includes: a fuel cell (1); a hydrogen supply device (2) for supplying a hydrogen gas to the fuel cell (1); an anode off-gas passage (22) through which an anode off-gas discharged from the anode side of the fuel cell (1) passes; a hydrogen concentration sensor (3) that measures the concentration of hydrogen in the anode off-gas; and a sensor correction device (4) that, after a predetermined time has elapsed since the hydrogen gas supply to the fuel cell by the hydrogen supply device (2) was stopped, measures the hydrogen concentration using the hydrogen concentration sensor (3), and corrects a measurement value from the hydrogen concentration sensor (3) based on the measured hydrogen concentration.

10 Claims, 2 Drawing Sheets

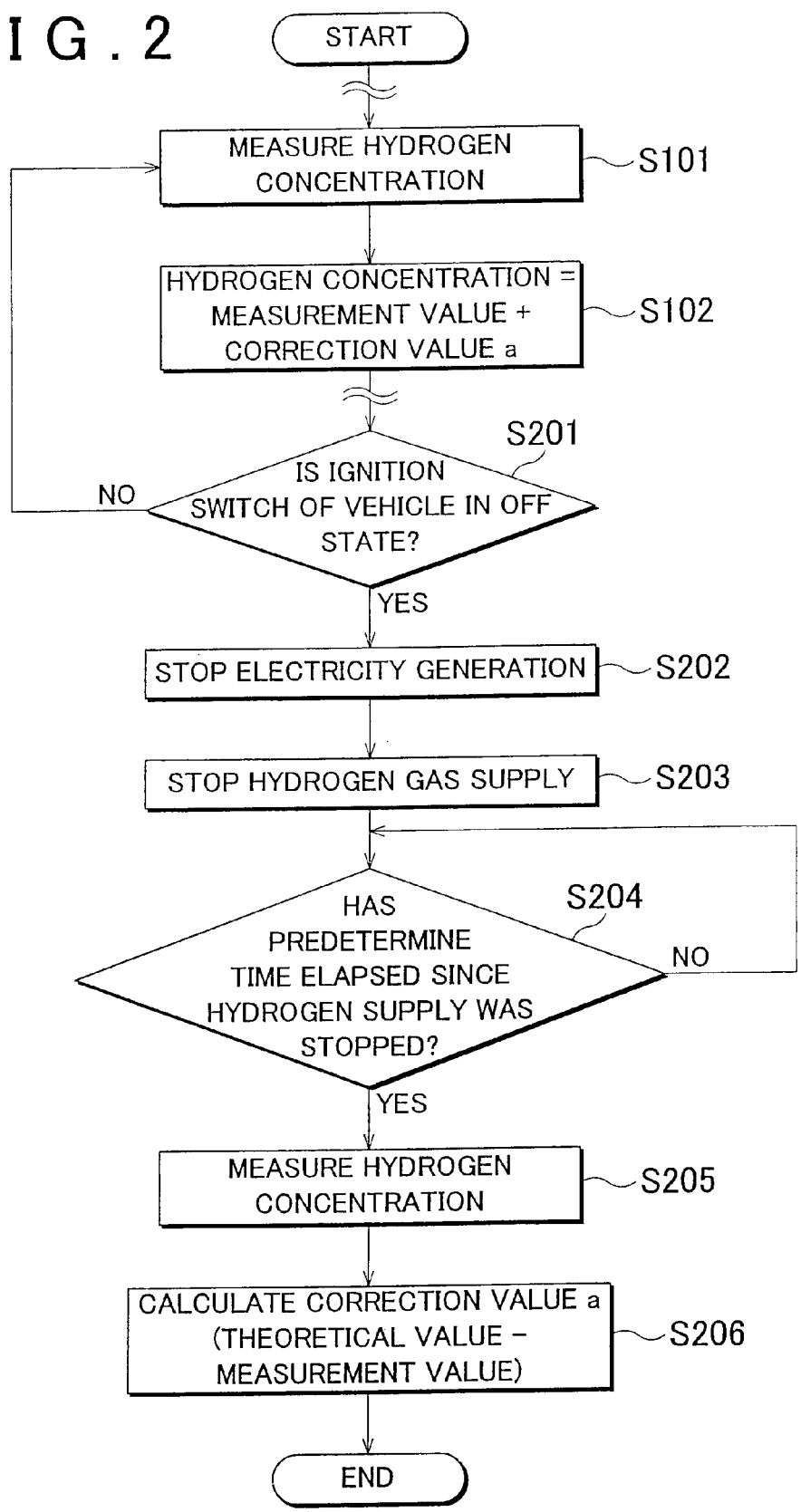

FUEL CELL SYSTEM AND CONTROL METHOD THEREOF

CROSS-REFERENCE TO RELATED APPLICATIONS

This application is a national phase application of International Application No. PCT/IB2007/000230, filed Jan. 31, 2007, and claims the priority of Japanese Application No. 2006-040299, filed Feb. 17, 2006, the contents of both of which are incorporated herein by reference.

BACKGROUND OF THE INVENTION

1. Field of the Invention

The present invention relates to a fuel cell system that generates electric energy through electrochemical reactions and a control method thereof.

2. Description of the Related Art

A Fuel cell system supplies a fuel gas, such as a hydrogen gas, and an oxidizing gas containing oxygen to a fuel cell to cause these gases to electrochemically react with each other through an electrolyte of the fuel cell in order to obtain electric energy.

A fuel cell system of the related art is provided with a hydrogen concentration sensor on an anode off-gas passage through which an anode off-gas discharged from the fuel cell passes, and measures the concentration of hydrogen contained in the anode off-gas (see Japanese Patent Application Publication No. 2004-95300 (JP-A-2004-95300), for example).

The hydrogen concentration measured by the hydrogen concentration sensor is used to perform various control operations of the fuel cell system, such as regulating the amount of the anode off-gas discharged from the anode side of the fuel cell. The hydrogen concentration sensor is therefore required to have high measurement accuracy. However, the accuracy of the hydrogen concentration sensor can decrease as it is used for a long time, which can cause an error.

SUMMARY OF THE INVENTION

An object of the present invention is to suppress the measurement error of a hydrogen concentration sensor and maintain the measurement accuracy of the hydrogen concentration sensor even after long-term use in a fuel cell system provided with the hydrogen concentration sensor that measures hydrogen concentration.

A first aspect of the present invention is a fuel cell system that includes: a fuel cell that generates electricity through electrochemical reactions between a hydrogen gas and an oxidizing gas; a hydrogen supply device for supplying the hydrogen gas to the fuel cell; an anode off-gas passage through which an anode off-gas discharged from the anode side of the fuel cell passes; a hydrogen concentration sensor, provided on the anode off-gas passage, that measures the concentration of hydrogen in the anode off-gas; and a sensor correction device that, after a predetermined time has elapsed since the hydrogen gas supply to the fuel cell by the hydrogen supply device was stopped, measures the hydrogen concentration using the hydrogen concentration sensor, and corrects a reference point of the hydrogen concentration sensor based on the measured hydrogen concentration.

The fuel cell system according to the first aspect includes the sensor correction device for correcting the reference point of the hydrogen concentration sensor, and can correct a measurement value and therefore the reference point of the sensor using the sensor correction device. After the predetermined time has elapsed since the hydrogen gas supply to the fuel cell by the hydrogen supply device was stopped, the sensor correction device corrects the reference point of the hydrogen concentration sensor based on the hydrogen concentration measured by the hydrogen concentration sensor.

The predetermined time is such that the measurement value from the hydrogen concentration sensor is supposed to become a certain value, such as 0%, when the predetermined time has elapsed since the hydrogen gas supply was stopped. In general, the hydrogen gas supplied to the fuel cell is consumed in the electricity generation process. However, even under the conditions in which the electricity generation process and the hydrogen gas supply are stopped, the hydrogen concentration decreases because the hydrogen reacts with the oxygen that has passed through the electrolyte film to the anode side or is replaced by the nitrogen or oxygen that has passed through the electrolyte to the anode side. After the predetermined time has elapsed since the hydrogen gas supply was stopped, the concentration of hydrogen becomes almost constant, and it is presumed that the measurement value from the hydrogen gas sensor also becomes constant. On the assumption that the difference between the estimated hydrogen concentration, which is a theoretical value, and the actual measurement value from the hydrogen concentration sensor is an error, the fuel cell system according to the first aspect corrects the error.

More specifically, for example, the time that elapses from when the hydrogen gas supply is stopped to when the measurement value from the hydrogen concentration sensor becomes substantially 0% is calculated in advance, and it is assumed that the hydrogen concentration is 0% when the predetermined time has elapsed since the hydrogen gas supply was stopped. If the measurement value from the hydrogen concentration sensor is not 0% after the lapse of the predetermined time, the measurement value from the sensor is corrected on the assumption that the difference between the actual measurement value and 0% is an error.

If the hydrogen concentration of the theoretical value and the actually measured hydrogen concentration are compared, and the measurement value from the hydrogen concentration sensor is corrected based on the difference therebetween in this way, it is possible to correct the reference point of the hydrogen concentration sensor. As a result, it is possible to appropriately correct the error of the sensor even if the hydrogen concentration sensor is used for a long time and becomes degraded to cause an error in the measurement value. In addition, if such correction is performed at a predetermined frequency, it is possible to maintain the measurement accuracy of the hydrogen concentration sensor even after long-term use.

the sensor correction device of the fuel cell system according to the present invention may stop the hydrogen gas supply to the fuel cell while maintaining the electricity generation process in the fuel cell, and measure the hydrogen concentration after the predetermined time has elapsed since the hydrogen gas supply to the fuel cell was stopped.

If the hydrogen gas supply to the fuel cell is stopped while maintaining the electricity generation process in the fuel cell, the hydrogen gas in the fuel cell is surely consumed in the electricity generation process, and the concentration thereof will therefore decrease. Thus, it is possible to increase the speed at which the hydrogen concentration decreases after the hydrogen gas supply is stopped. In the case where the predetermined time is set to the time that elapses from when the hydrogen supply is stopped to when the hydrogen concentration is supposed to be 0%, for example, if the speed at which the hydrogen concentration decreases is increased, the fuel cell is more rapidly brought into a state in which the hydrogen concentration is supposed to be 0%, which makes it possible to shorten the predetermined time that is used to perform the correction.

The predetermined time in the fuel cell system according to the above aspect may be such that the hydrogen concentration in the anode off-gas passage measured by the hydrogen concentration sensor is supposed to become substantially 0% when the predetermined time has elapsed since the hydrogen gas supply to the fuel cell was stopped as described above, or may be such that the hydrogen concentration is supposed to become another constant concentration when the predetermined time has elapsed since the hydrogen gas supply to the fuel cell was stopped. In other words, it suffices that the predetermined time is such that the concentration of hydrogen is supposed to become a constant concentration when the predetermined time has elapsed since the hydrogen gas supply to the fuel cell was stopped. The predetermined time is appropriately set according to the permeability coefficient of the electrolyte film constituting the fuel cell, the volume of hydrogen gas in the fuel cell, the volume of the inside of the anode off-gas passage, etc.

According to the fuel cell system according to the above aspect of the present invention, it is possible to correct the error of the hydrogen concentration sensor, and, therefore, it is possible to maintain the measurement accuracy of the hydrogen concentration sensor even after long-term use.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is a flow chart showing a process performed in the fuel cell system according to the embodiment.

DETAILED DESCRIPTION OF THE PREFERRED EMBODIMENTS

Figure 1:
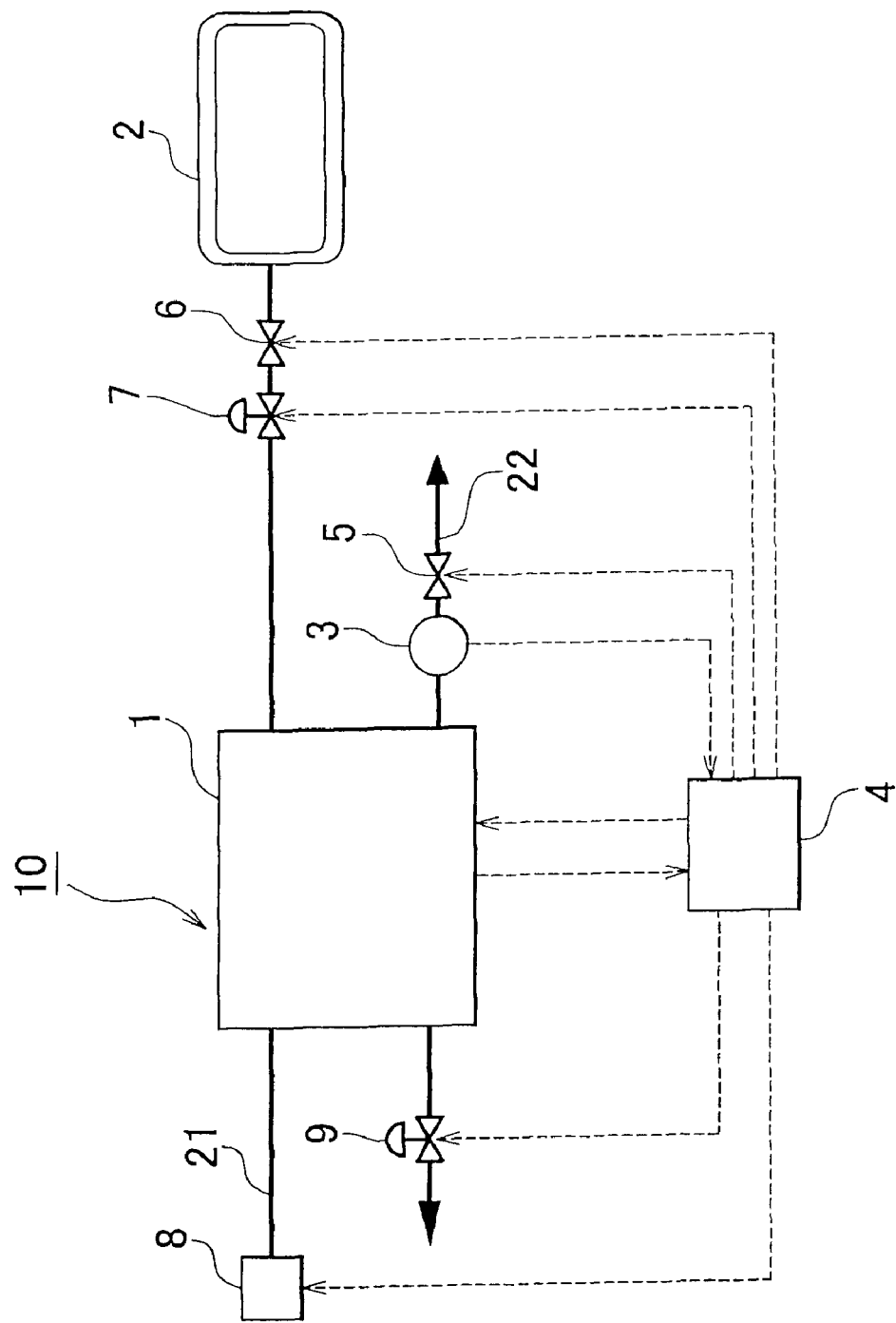
FIG. 1 is a configuration diagram of a fuel cell system according to an embodiment.

An embodiment of a fuel cell system according to the present invention will be described in detail with reference to the drawings. The fuel cell system according to this embodiment is an example embodiment used in a fuel cell vehicle that uses the fuel cell system as a driving power source.

FIG. 1 is a configuration diagram of the fuel cell system according to this embodiment. The fuel cell system 10 includes: a fuel cell 1 that generates electricity through electrochemical reactions between a hydrogen gas and an oxidizing gas; a high-pressure hydrogen tank 2 as a hydrogen supply device that supplies the hydrogen gas to the fuel cell 1, the high-pressure hydrogen tank 2 storing the hydrogen gas as a fuel gas; a release valve 6 of the high-pressure hydrogen tank 2; a regulator valve 7 for regulating the pressure of the hydrogen gas that is discharged from the high-pressure hydrogen tank 2; an oxidizing gas supply passage 21 through which air to be supplied to the fuel cell 1 passes; an air compressor 8, provided on the oxidizing gas supply passage 21, that supplies the oxidizing gas to the fuel cell 1; an anode off-gas passage 22 through which anode off-gas discharged from the anode side of the fuel cell 1 passes; a hydrogen concentration sensor 3, provided on the anode off-gas passage 22, that measures the concentration of hydrogen in the anode off-gas; an exhaust valve 5, provided downstream of the hydrogen concentration sensor 3 on the anode off-gas passage 22, for discharging the anode off-gas from the system; a regulator valve 9 for regulating the pressure of the cathode off-gas discharged from the cathode side of the fuel cell 1; and an ECU 4 that performs various control operations, such as control of hydrogen gas supply by the high-pressure hydrogen tank 2, control of oxidizing gas supply, and control of electricity generation by the fuel cell 1.

The hydrogen concentration sensor 3 measures the hydrogen concentration in the anode off-gas that passes through the anode off-gas passage 22. The value measured by the hydrogen concentration sensor 3 is input to the ECU 4. The ECU 4 regulates the amount of discharged anode off-gas by operating the exhaust valve 5 based on the hydrogen concentration to regulate the hydrogen concentration in the anode off-gas passage 22 to a predetermined concentration.

The anode off-gas discharged from the anode side of the fuel cell 1 contains the hydrogen that was not consumed in the electrochemical reaction, as well as the nitrogen that has passed through the electrolyte film to the anode side. However, if the hydrogen gas supply from the high-pressure hydrogen tank 2 is stopped, the hydrogen in the anode off-gas either reacts with the oxygen that has passed through an electrolyte film, or passes through the electrolyte film to the cathode side. Accordingly, when the hydrogen gas supply from the high-pressure hydrogen tank 2 is stopped, the hydrogen concentration decreases with time.

In this embodiment, the relationship between the time elapsed since the hydrogen supply was stopped and the hydrogen concentration when the same time has been elapsed since the hydrogen supply was stopped is previously determined; and the time that elapses from when the hydrogen gas supply is stopped to when the hydrogen concentration in the anode off-gas passage 22 provided with the hydrogen concentration sensor becomes substantially 0% is set as a predetermined time. When the predetermined time has elapsed since the hydrogen gas supply was stopped, the hydrogen concentration is measured using the hydrogen concentration sensor 3, and the measurement value from the hydrogen concentration sensor 3 is corrected using, as an error, the difference between the measurement value and 0%, which is a theoretical value.

In this embodiment, the correction value for the hydrogen concentration sensor 3 is calculated when the electricity generation by the fuel cell 1 is stopped, and, based on the hydrogen concentration that reflects the calculated correction value, various control operations of the fuel cell system 10, such as regulating the amount of discharged anode off-gas, are performed.

The sensor correction control performed in the fuel cell system 10 constructed as described above will be described in detail below. Various control operations described hereinafter are performed by the ECU 4. FIG. 2 is a flow chart showing the sensor correction control according to this embodiment.

When the electricity generation process in the fuel cell 1 is performed, the ECU 4 measures the hydrogen concentration in the anode off-gas passing through the anode off-gas passage 22 using the hydrogen concentration sensor 3 (S101) in order to regulate the amount of the anode off-gas that is discharged from the system based on the hydrogen concentration.

Step S102 is a step for adding the correction value $\alpha$, described later, to the hydrogen concentration measured in step S101 to set the hydrogen concentration that is used as a reference in performing various control operations. In this embodiment, various control operations, such as control of the amount of discharged anode off-gas and control of the supply amount of hydrogen gas and oxidizing gas, are performed using, as the reference point of the hydrogen concentration, the value obtained by adding the correction value α to the value actually measured by the hydrogen concentration sensor 3. Accordingly, various control operations, such as control of the amount of discharged anode off-gas, are performed based on the corrected hydrogen concentration under normal operation conditions (that is, when the fuel cell is generating electricity) in and after step 102.

Next, correction of the sensor performed when electricity generation by the fuel cell 1 is stopped will be described. Upon receiving a signal indicative of the switching-off operation of the ignition key of the vehicle (S201), the ECU 4 stops the electricity generation by the fuel cell 1 (S202), and stops the hydrogen supply from the high-pressure hydrogen tank 2 to the fuel cell 1 (S203).

Subsequently, the ECU 4 performs correction of the hydrogen concentration sensor 3. The ECU 4 waits until the predetermined time elapses since the hydrogen gas supply is stopped in step S203 (S204), and then measures the hydrogen concentration using the hydrogen concentration sensor 3 when the predetermined time has elapsed (S205).

The predetermined time is such that the measurement value from the hydrogen concentration sensor 3 is supposed to become substantially 0% when the predetermined time has elapsed. The predetermined time is preset. If the hydrogen concentration measured in step S205 is not 0%, the difference between the measurement value and 0%, which is a theoretical value, is an error, and the error is set as a correction value α (S206).

Specifically, the value obtained by subtracting a value α2 that is actually measured when the predetermined time has elapsed since the hydrogen gas supply was stopped from a theoretical value α1 of the hydrogen concentration measured when the predetermined time has elapsed since the hydrogen gas supply was stopped is the correction value α. The value α is the value to be added to the measurement value when the hydrogen concentration is corrected in step S102.

The thus calculated correction value α is added to the measurement value from the sensor when various control operations are performed based on the hydrogen concentration in the anode off-gas passage 22 (S102). Even if the hydrogen concentration sensor 3 is used for a long time and becomes degraded over time, it is possible to appropriately correct the error due to the degradation by performing the correction as appropriate.

Although the value calculated in step S206, that is, the value calculated after a single measurement, is used as the correction value in this embodiment, the average value obtained by calculating the correction value a plurality of times and averaging the calculated correction values may be used as the correction value, for example. In addition, the upper and lower limits of the correction value may be set. By appropriately setting the correction value in this way, it is possible to improve the measurement accuracy of the hydrogen concentration sensor and suppress the measurement error.

In addition, although, in the above-described embodiment, the hydrogen gas supply is stopped under the conditions in which the electricity generation process in the fuel cell is stopped, the present invention is not limited to this configuration. The electricity generation process in the fuel cell may be continued for a certain period of time under the conditions in which the hydrogen gas supply is stopped. If the electricity generation process in the fuel cell is continued in this way, it is possible to set the predetermined time that elapses from when the hydrogen gas supply is stopped to when the hydrogen concentration becomes substantially 0% to a shorter time.

While the invention has been described with reference to what are considered to be preferred embodiments thereof, it is to be understood that the invention is not limited to the disclosed embodiments or constructions.

The invention claimed is:

1. A fuel cell system comprising:
   a fuel cell that generates electricity through electrochemical reactions between a hydrogen gas and an oxidizing gas;
   a hydrogen supply device that supplies the hydrogen gas to the fuel cell;
   an anode off-gas passage through which an anode off-gas discharged from the anode side of the fuel cell passes;
   a hydrogen concentration sensor, provided on the anode off-gas passage, that measures the concentration of hydrogen in the anode off-gas; and
   a controller that is programmed to correct a measurement value from the hydrogen concentration sensor by a correction value obtained based on a difference between the measured hydrogen concentration and a theoretical value;
   wherein the measurement value of the hydrogen concentration is measured after a predetermined time has elapsed since the hydrogen gas supply to the fuel cell by the hydrogen supply device was stopped and the hydrogen gas supply to the fuel cell remains stopped until the hydrogen concentration is measured.

2. The fuel cell system according to claim 1, wherein the controller is programmed to stop the hydrogen gas supply to the fuel cell while maintaining the electricity generation process in the fuel cell.

3. The fuel cell system according to claim 1, wherein
   the predetermined time is such that the hydrogen concentration in the anode off-gas passage measured by the hydrogen concentration sensor is supposed to become substantially 0% when the predetermined time has elapsed since the hydrogen gas supply to the fuel cell was stopped.

4. The fuel cell system according to claim 1, wherein
   the controller corrects the measurement value from the hydrogen concentration sensor based on an average value of a plurality of hydrogen concentration measurements measured by the hydrogen concentration sensor.

5. The fuel cell system according to claim 1, wherein, when correcting the measurement value from the hydrogen concentration sensor, the controller is programmed to impose upper and lower limits on the correction value.

6. A method of controlling a fuel cell system comprising:
   stopping hydrogen gas supply to the fuel cell;
   measuring hydrogen concentration in an anode off-gas passage after a predetermined time has elapsed since the hydrogen gas supply was stopped wherein the hydrogen gas supply to the fuel cell remains stopped until the hydrogen concentration is measured;
   calculating a correction value of the hydrogen concentration based on the measured hydrogen concentration;
   correcting a measurement value from a hydrogen concentration sensor by a correction value obtained based on a difference between the calculated correction value and a theoretical value; and
   controlling the fuel cell system based on the corrected hydrogen concentration.

7. The method of controlling a fuel cell system according to claim 6, wherein the hydrogen gas supply to the fuel cell is stopped while continuing generating electricity using the fuel cell, and, after the predetermined time has elapsed since the hydrogen gas supply to the fuel cell was stopped, the hydrogen concentration in the anode off-gas passage is measured.

8. The fuel cell system according to claim 2, wherein
the predetermined time is such that the hydrogen concentration in the anode off-gas passage measured by the hydrogen concentration sensor is supposed to become substantially 0% when the predetermined time has elapsed since the hydrogen gas supply to the fuel cell was stopped.

9. The fuel cell system according to claim 2, wherein
the controller corrects the measurement value from the hydrogen concentration sensor based on an average value of a plurality of hydrogen concentration measurements measured by the hydrogen concentration sensor.

10. The fuel cell system according to claim 2, wherein, when correcting the measurement value from the hydrogen concentration sensor, the controller is programmed to impose upper and lower limits on the correction value.

* * * * *